US010296907B1

(12) United States Patent
Nolte et al.

(10) Patent No.: US 10,296,907 B1
(45) Date of Patent: May 21, 2019

(54) SYSTEMS AND METHODS FOR ELECTRONIC PRESENTATION OF FINANCIAL INSTRUMENT OFFERS

(71) Applicant: United Services Automobile Association (USAA), San Antonio, TX (US)

(72) Inventors: Matthew Nolte, San Antonio, TX (US); Marcus Lee Willard, San Antonio, TX (US); Raquel Alexis Low, San Antonio, TX (US); Michelle Leib, San Antonio, TX (US); Emily Krebs, San Antonio, TX (US); Bryan Osterkamp, New Braunfels, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 147 days.

(21) Appl. No.: 15/421,652

(22) Filed: Feb. 1, 2017

Related U.S. Application Data

(60) Provisional application No. 62/289,450, filed on Feb. 1, 2016.

(51) Int. Cl.
| | |
|---|---|
| *G06F 1/00* | (2006.01) |
| *G06Q 20/10* | (2012.01) |
| *G06Q 20/20* | (2012.01) |
| *G06Q 20/34* | (2012.01) |
| *G06Q 20/40* | (2012.01) |

(52) U.S. Cl.
CPC ............ *G06Q 20/401* (2013.01); *G06F 1/00* (2013.01); *G06Q 20/1085* (2013.01); *G06Q 20/202* (2013.01); *G06Q 20/357* (2013.01)

(58) Field of Classification Search
CPC ............ G06Q 20/401; G06Q 20/1085; G06Q 20/202; G06Q 20/357; G06F 1/00
USPC .......................................................... 705/21
See application file for complete search history.

(56) References Cited

U.S. PATENT DOCUMENTS

| | | | | |
|---|---|---|---|---|
| 5,956,694 | A * | 9/1999 | Powell ............... | G06Q 20/3437 235/375 |
| 6,233,683 | B1 * | 5/2001 | Chan ...................... | G06F 21/51 713/172 |
| 6,631,849 | B2 * | 10/2003 | Blossom .......... | G06K 19/06187 235/380 |

(Continued)

*Primary Examiner* — Florian M Zeender
*Assistant Examiner* — Nicole Elena Bruner
(74) *Attorney, Agent, or Firm* — Perkins Coie LLP

(57) ABSTRACT

Methods and systems described in this disclosure generally relate to presentation of electronic offers that are viewable on financial instruments (e.g., credit cards and debit cards) by users. More specifically, various embodiments of the present disclosure relate to methods and systems for embedding information pertaining to the electronic offers on a financial instrument of a user. The information can be displayed on a screen or using flashing lights included inside or on the surface of the financial instrument. These offers can be provided by merchants or by banks and financial institutions associated with the financial instrument. In some embodiments, the financial instrument communicates with a mobile application running on a user's mobile device via wireless communication methods to receive offer-related information provided by the mobile application.

20 Claims, 14 Drawing Sheets

(56) References Cited

U.S. PATENT DOCUMENTS

| | | | | |
|---|---|---|---|---|
| 7,784,687 B2* | 8/2010 | Mullen | | G06K 19/06206 235/380 |
| 7,946,501 B2* | 5/2011 | Borracci | | G06K 19/0718 235/380 |
| 8,393,546 B1* | 3/2013 | Yen | | G06K 19/06206 235/487 |
| 8,523,059 B1* | 9/2013 | Mullen | | G06Q 20/204 235/379 |
| 9,195,975 B2* | 11/2015 | Pochic | | G06Q 20/409 |
| 2004/0024670 A1* | 2/2004 | Valenzuela | | G06F 21/10 705/35 |
| 2004/0243468 A1* | 12/2004 | Cohagan | | G06Q 30/02 705/14.23 |
| 2010/0223110 A1* | 9/2010 | Slavin | | G06Q 30/02 705/14.3 |
| 2011/0010238 A1* | 1/2011 | Postrel | | G06Q 30/02 705/14.38 |
| 2013/0112756 A1* | 5/2013 | Poidomani | | G06K 19/0702 235/492 |
| 2013/0197987 A1* | 8/2013 | Doka | | G06Q 30/0227 705/14.28 |
| 2013/0304561 A1* | 11/2013 | Warner | | G06Q 30/0226 705/14.33 |
| 2014/0026213 A1* | 1/2014 | Antebi | | G01S 5/22 726/20 |
| 2014/0074696 A1* | 3/2014 | Glaser | | G06Q 20/341 705/39 |
| 2014/0183269 A1* | 7/2014 | Glaser | | G06F 21/32 235/492 |
| 2014/0263626 A1* | 9/2014 | Pochic | | G06Q 20/341 235/380 |
| 2014/0339315 A1* | 11/2014 | Ko | | G06K 19/06206 235/492 |
| 2015/0032635 A1* | 1/2015 | Guise | | G06Q 20/356 705/72 |
| 2015/0206203 A1* | 7/2015 | Tietzen | | G06Q 30/0279 705/14.3 |
| 2016/0307089 A1* | 10/2016 | Wurmfeld | | G06K 19/0702 |
| 2017/0109620 A1* | 4/2017 | Wurmfeld | | G06Q 20/341 |
| 2017/0109730 A1* | 4/2017 | Locke | | G06Q 20/341 |
| 2017/0154328 A1* | 6/2017 | Zarakas | | G06Q 20/341 |

\* cited by examiner

US 10,296,907 B1

SYSTEMS AND METHODS FOR ELECTRONIC PRESENTATION OF FINANCIAL INSTRUMENT OFFERS

CROSS-REFERENCE TO RELATED APPLICATIONS

This application is a non-provisional of and claims priority to U.S. Provisional Application No. 62/289,450, filed on Feb. 1, 2016, entitled "SYSTEMS AND METHODS FOR ELECTRONIC PRESENTATION OF FINANCIAL INSTRUMENT OFFERS," which is hereby incorporated by reference in its entirety for all purposes.

TECHNICAL FIELD

Various embodiments of the present disclosure generally relate to payment vehicle rewards and offers. More specifically, various embodiments of the present disclosure relate to methods and systems for electronic presentation of credit card offers viewable on credit cards and debit cards.

BACKGROUND

Users of financial instruments such as debit cards and credit cards may not be not aware of various offers they can obtain by using the credit cards or debit cards. Information regarding offers can be received as flier invitations in the mail or included as part of financial statements provided by their banks and financial institutions. Not only can such received information be out of date, but also, users are not reminded or alerted of available offer(s) at the time they use the debit cards or credit cards. This results in users' not redeeming offers.

BRIEF DESCRIPTION OF THE DRAWINGS

Embodiments of the present disclosure will be described and explained through the use of the accompanying drawings in which.

DETAILED DESCRIPTION

Figure 1:
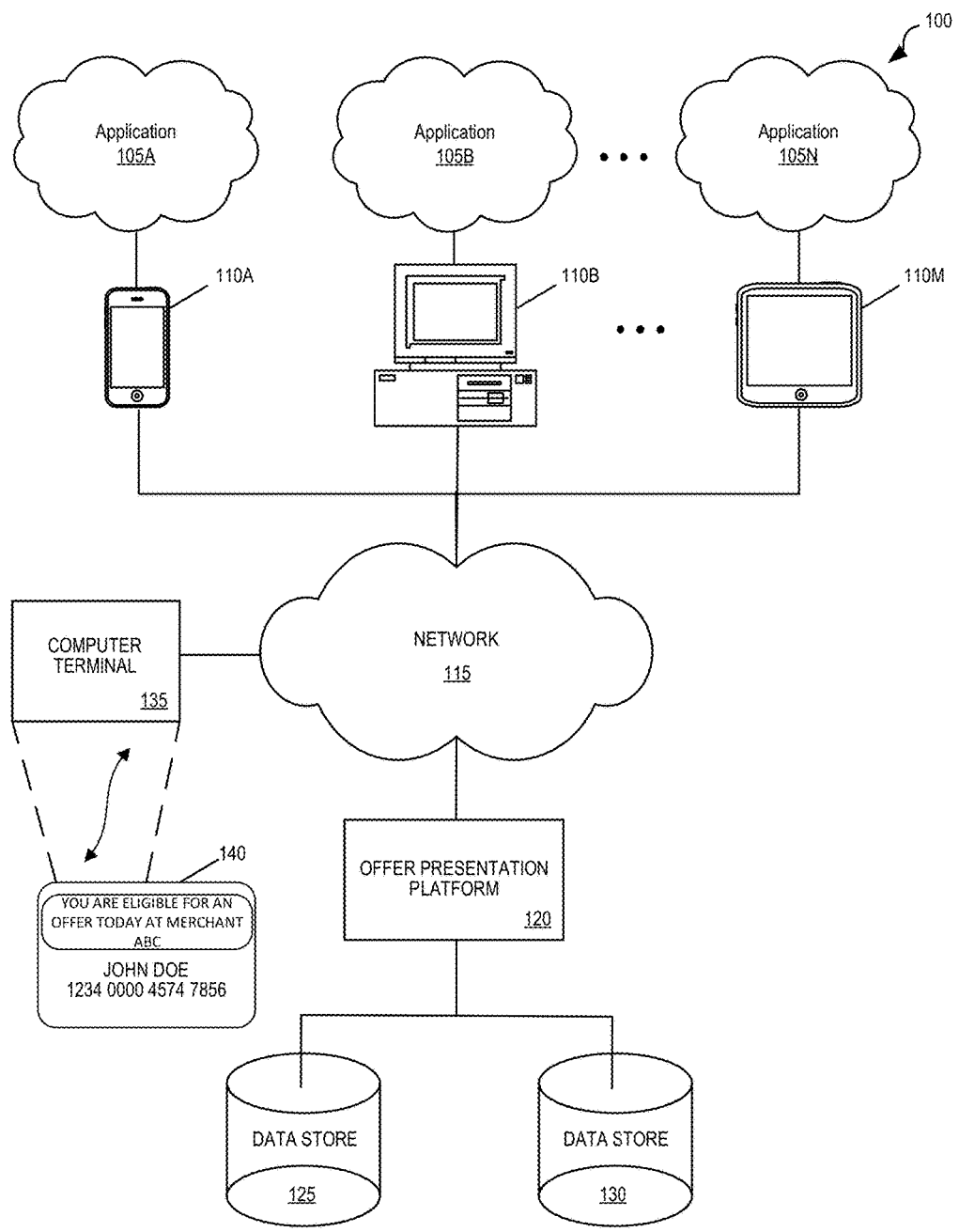
FIG. 1 illustrates an example of a network-based operating environment in accordance with various embodiments of the present disclosure.

Various embodiments of the present disclosure generally relate to offers, including presentation of electronic offers that are viewable on financial instruments (e.g., credit cards and debit cards) by users. More specifically, various embodiments of the present disclosure relate to methods and systems for embedding information pertaining to the electronic offers on a financial instrument of a user.

Many financial instruments carry an embedded chip. These financial instruments are referred to as chip cards or Chip-Enabled Card Acceptance (EMV) cards. According to embodiments disclosed herein, the chip in the EMV cards can be programmed to communicate electronic offer-related information for presenting to users. The card may receive updated offers when inserted into a point of sale (POS), kiosk, or other card-reading device. In some embodiments, the card can receive offers via a mobile device. Offer information, provided by either the user's bank or a merchant, is provided to a user's financial instrument via a computer terminal. In some embodiments, information provided to a user's financial instrument can be for a future purchase or use of the card. Thus, if a user purchases items at a grocery store, offers can be loaded onto the user's financial instrument via the POS terminal at the grocery store. However, even when the user leaves the grocery store, and does not swipe or insert the financial instrument, the visual indication mechanism (e.g., based on display screen or flashing lights) on the user's card can notify the user of future offers and deals. Thus, embodiments of the present disclosure allow users to receive electronic offers in real time, as well as those that are redeemable in the future.

After receiving the electronic offer at the card, the offer can be presented by the card in many ways. One way of presenting offers is via a visual indication mechanism included in the financial instrument. For example, an LED (or LCD) light included on the top surface of the card can flash to indicate that the user can redeem an offer by using the credit card while shopping at a merchant location. When a user swipes or inserts the card at a computer terminal (e.g., the merchant's POS terminal or an ATM kiosk of a bank), the user can redeem the electronic offer. For example, the offer can be in the form of freebies, discounts, coupons, low interest rate, or cash back. Such information may be helpful to the user when determining which card to use.

In some embodiments, a visual indication mechanism included in the financial instrument can be in the form of a screen displaying offer-related information. When a user inserts, swipes, or otherwise presents the card at the computer terminal, the user can redeem the electronic offer. Examples of the embedded information can include promotional offers such as points, miles, or cash back for purchases in categories such as gas, restaurant, home furnishing, or for purchases at specific merchants, or any other category of purchase. For instance, the screen can display the string, "You have a 5% cashback on gas today" and, in such circumstances, the user will receive a 5% cashback for using their card to purchase gas on the day the offer is presented. Another message can recite, "Get 10% off dinner for two at ABC Burgers today." In some embodiments, the embedded information can be an offer to transfer a balance to the card at a low interest rate. These offers can be provided by merchants or by banks and financial institutions associated with the financial instrument. In some embodiments, the screen can display non-offer-related information as well. Examples of such information can be available credit limit, available cash advance limit, and the like.

In some embodiments, the chip in the EMV cards can be programmed to communicate electronic offers (or related information) to mobile devices of users. A mobile application running on the user's mobile device can receive push notifications about offers from a remote server. When the user brings his or her financial instrument within close range of the mobile device, the financial instrument can receive, for example, via Bluetooth connectivity with the application running on the user's mobile device, information pertaining to electronic offers. Therefore, in some scenarios, a user's financial instrument can be loaded with electronic offer-related information regardless of a user swiping or inserting his or her financial instrument at the computer terminal.

In some embodiments, the offer-related information, in part or in entirety, can be displayed by the mobile application. In some embodiments, the mobile application can remotely push offer notifications to the financial instrument to program the electronic chip in the financial instrument. Thus, embodiments of the present disclosure facilitate loading electronic offer-related information onto a financial instrument using many methods and various types of technologies (e.g., radio frequencies, Bluetooth, NFC, Wi-Fi, and EMV card readers).

The chip in the EMV cards, for example, can be programmed by a script running on the chip. When offer-related information is to be loaded onto or changed on a financial card, the script can be updated to include the new (or updated) offer-related information. For example, the chip in the credit card can communicate (e.g., via Bluetooth pairing) with an application running on the user's mobile device. When the user's mobile device receives a notification that, for instance, a hypothetical merchant "Waysub" is offering deals on subs, a user can be notified of the redeemable deal by flashing lights or a message on the credit card. Such notification can result in greater utilizations of the financial instrument by users who wish to avail themselves of these offers.

Furthermore, in scenarios where the offers are seasonal or cyclical, a user can be reminded of such offers. Also, credit cards that provide visual reminders of offers are likely to receive more attention than others. In some embodiments, the chip in the credit card can communicate (via Bluetooth pairing) with an application running on the user's mobile device and receive information relating to next payment due, minimum amount due, balance pending, available credit and cash lines, or any other financial information relating to the subject financial card, without requiring the user to log into the user's financial account at the card's issuer or financial institution. In some embodiments, the screen of the visual indication mechanism can display both offer-related information and financial information relating to the subject financial card. For example, the screen can provide a scroll-up or scroll-down feature that allows a user to view data displayed on the screen. A user can see a message reciting "[y]ou have a $1000 balance and a 5% cash back on purchases at bars and restaurants this month."

The chip in the EMV cards can be powered by different types of power sources that can be passive sources such as RFID. The visual indication mechanism (e.g., display screen or LED/LCD flashing lights) can display alerts about offers for any interval of time, without limitation. For example, if an offer is a one-day or a weekend offer, then the visual indication can be turned on for just the day or the weekend. For offers that are longer and last days, weeks, or months, the visual indication mechanism can show offer-related alerts for a greater length of time. Thus, in some scenarios, a financial card can stay lighted up in a user's wallet or purse, even when it is not being used in a purchase transaction. Such scenarios can be beneficial in that it can constantly remind and alert users that the credit card has current offers. In some scenarios, the color or the flashing pattern on the LED/LCD lights can change, depending on how good the offer is or how long an offer is going to last. For example, an offer that expires in a day might be indicated by a red light, and an offer that expires in seven days or more can be indicated by a green light. Thus, aspects disclosed herein allow different types of light patterns with various colors or flashing sequences, which can correspond to, or be indicative of, how long the offer will last.

In some embodiments, offers and offer-related information is received via a portal of a financial institution accessible by an electronic device. For example, when a user logs into their financial account summaries, the user can receive offer-related information in the form of a banner or a separate page alerting the user of the redeemable offer. In some scenarios, offers can be in the form of balance transfer offers. An example of such an offer can be "[s]ign up for ABC credit card today for a 0% annual interest percentage rate for balance transfers up to 1.5 years." Another offer can be "buy one get one coffee free this weekend at ABC Coffee Shop." After being presented with the offers, a user can review details of the offers if he or she wishes to redeem them.

As used herein, the term "user" is not limited to private individuals but can include small and large business owners. More generally, the term "user" includes any person or entity that uses the system.

In the following description, for the purposes of explanation, numerous specific details are set forth in order to provide a thorough understanding of embodiments of the present disclosure. However, it will be apparent on reading the disclosure, to one skilled in the art, that embodiments may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other types of media/machine-readable medium suitable for storing electronic instructions.

FIG. 1 illustrates an example of a network-based operating environment 100 in which some embodiments of the present disclosure may be used. As illustrated in FIG. 1, operating environment 100 may include applications 105A-105N running on one or more computing devices 110A-110M (such as a mobile device; a mobile phone; a telephone; a tablet computer; a mobile media device; a mobile gaming device; a vehicle-based computer; a dedicated terminal; a public terminal, desktop, or laptop computer; a kiosk; wearable devices such as a smartwatch; etc.). In some embodiments, applications 105A-105N may be stored on one or more computing devices 110A-110M or may be stored remotely on a server (in the "cloud"). These computing devices 110A-110M can include mechanisms for receiving and sending traffic by connecting through network 115 to offer presentation platform 120 and data stores 125 and 130.

In some embodiments, the present disclosure relates to methods and systems for embedding information pertaining to electronic offers on a financial instrument 140 of a user. Offer information, provided by either the user's bank or a merchant, is transmitted to a user's financial instrument via the computer terminal 135 as the user swipes or inserts a card. Computer terminal 135 can be, for example at the merchant location. The information can be displayed on a screen or trigger flashing lights included inside or on the surface of the financial instrument 140. Thus, a user can see red flashing lights or messages displayed (via a screen) on a credit card, for example, alerting him or her of a redeemable offer. For example, financial instrument 140 includes a message reciting "[y]ou are eligible for an offer at merchant ABC" to a user John Doe.

According to embodiments disclosed herein, a chip embedded in financial instruments such as credit cards and debit cards can be programmed to communicate electronic offer-related information to users. Electronic offers, according to embodiments disclosed herein, can be presented in many ways. One way of presenting offers is via a visual indication mechanism in the financial instrument. For example, when an LED or LCD light included on the top surface of the card flashes, this can indicate that the user can redeem an offer while shopping at a merchant location if the card is used. Thus, when a user swipes or inserts the card at the computer terminal 135, the user can redeem the electronic offer when offer information is passed along from the merchant or the bank to the user's financial card via the computer terminal 135. The offer can be in the form of freebies, discounts, coupons, cash back, or any other form of offers.

In some embodiments, the chip in financial instrument 140 can be programmed to communicate electronic offers (or related information) to computing devices 110A-110N of users. An application 105A-105N running on the user's mobile device can receive push notifications about offers from a remote server. When the user brings his or her financial instrument 140 within close range of a computing device, financial instrument 140 can receive information pertaining to electronic offers via, for example, Bluetooth connectivity with application 105A-105N running on the user's computing device 110A-110M.

Therefore, in some scenarios, a user's financial instrument 140 can be loaded with electronic offer-related information regardless of a user swiping or inserting his or her financial instrument 140 at the computer terminal 135. In some scenarios, the offer-related information, in part or in entirety, can be displayed by the mobile application 105A-105N. In some embodiments, the mobile application 105A-105N can remotely push offer notifications to financial instrument 140 to program an electronic chip in financial instrument 140. Thus, embodiments of the present disclosure facilitate loading electronic offer-related information by many different ways and using various types of technologies (e.g., radio frequencies, Bluetooth, NFC, Wi-Fi, and EMV card readers).

Computing devices 110A-110M may be configured to communicate via the network 115 with offer presentation platform 120. In some embodiments, computing devices 110A-110M can retrieve or submit information to offer presentation platform 120 and run one or more applications 105A-105N with customized content retrieved by offer presentation platform 120 and data stores 125 and 130. For example, computing devices 110A-110M can execute a browser application or a customized client to enable interaction between the computing devices 110A-110M, offer presentation platform 120, and data stores 125 and 130. In some embodiments, computing devices 110A-110M can receive offer-related information from offer presentation platform 120. In some embodiments, computing devices 110A-110M can communicate offer-related information to one or more financial instruments 140 of a user.

Network 115 can be any combination of local area and/or wide area networks, using wired and/or wireless communication systems. Network 115 could use any or more protocols/technologies: Ethernet, IEEE 802.11 or Wi-Fi, worldwide interoperability for microwave access (WiMAX), cellular telecommunication (e.g., 3G, 4G, 5G), CDMA, cable, digital subscriber line (DSL), etc. Similarly, the networking protocols used on network 115 may include multiprotocol label switching (MPLS), transmission control protocol/Internet protocol (TCP/IP), User Datagram Protocol (UDP), hypertext transfer protocol (HTTP), simple mail transfer protocol (SMTP), and file transfer protocol (FTP). Data exchanged over network 115 may be represented using technologies, languages, and/or formats, including hypertext markup language (HTML) or extensible markup language (XML). In addition, all or some links can be encrypted using conventional encryption technologies such as secure sockets layer (SSL), transport layer security (TLS), and Internet Protocol security (IPsec).

Offer presentation platform 120 can be running on one or more servers and can be used to: (1) receive data from one or more sources, including data from users and financial institutions of users, offer-related data from merchants; (2) create offers for users; (3) store user profiles and/or user's financial data in data stores 125 and 130; and/or (4) perform other activities. In some embodiments, offer presentation platform 120 includes various data processing and analytic tools that allow for recognition of offers that might be of interest to certain user groups based on age, sex, finances, and other factors. In some embodiments, offer presentation platform 120 is a server. In some embodiments, offer presentation platform 120 performs online validation of a user's financial instrument 140 in real time at merchant locations. Such validation, for example, can be based on a match between the user profile data stored in a user's financial instrument 140 received at the time of validation, and pre-stored user profile information.

Data stores 125 and 130 can be used to manage storage and access to user data such as user profiles, users' financial and personal data, data received from third parties, data received from users' banks and financial institutions, data received from credit agencies, merchant-related data, data related to offers, and other information. Data stores 125 and 130 may be a data repository of a set of integrated objects that are modeled using classes defined in database schemas. Data stores 125 and 130 may further include flat files that can store data. Offer presentation platform 120 and/or other servers may collect and/or access data from the data stores 125 and 130. Information provided by users can also be stored in data stores 125 and 130.

Figure 2:
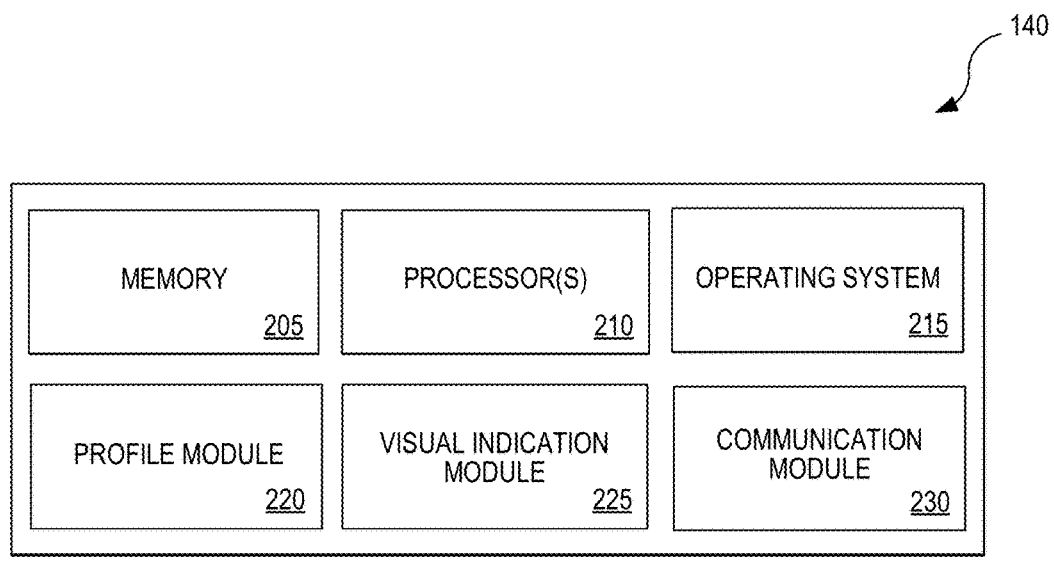
FIG. 2 illustrates various components of an electronic financial instrument that may be used in accordance with various embodiments of the present disclosure.

FIG. 2 illustrates a set of components according to one or more embodiments of the present disclosure. The components in FIG. 2 can be included in a financial instrument 140 of the user. According to the embodiments shown in FIG. 2, financial instrument 140 can include memory 205, one or more processors 210, operating system 215, a profile module 220, a visual indication module 225, and communication module 230. Other embodiments of the present disclosure may include some, all, or none of these modules and components, along with other modules, applications, and/or components. Still yet, some embodiments may incorporate two or more of these modules and components into a single module, and/or associate a portion of the functionality of one or more of these modules with a different module.

Memory 205 can store instructions for running one or more applications or modules on processor(s) 210. For example, memory 205 can store a programmable script to run when offer-related information is received. Generally, memory 205 could be used in one or more embodiments to house all or some of the instructions needed to execute the functionality of profile module 220, visual indication module 225, and communication module 230.

Generally, memory 205 can include any device, mechanism, or populated data structure used for storing information. In accordance with some embodiments of the present disclosure, memory 205 can encompass, but is not limited to, any type of volatile memory, nonvolatile memory, and dynamic memory. For example, memory 205 can be random access memory, memory storage devices, optical memory devices, magnetic media, floppy disks, magnetic tapes, hard drives, SIMMs, SDRAM, DIMMs, RDRAM, DDR RAM, SODIMMS, EPROMs, EEPROMs, compact discs, DVDs, and/or the like. In accordance with some embodiments, memory 205 may include one or more disk drives, flash drives, databases, tables, files, local cache memories, processor cache memories, relational databases, flat databases, and/or the like. In addition, those of ordinary skill in the art will appreciate many additional devices and techniques for storing information that can be used as memory 205.

Operating system 215 can provide a software package that is capable of managing the hardware resources of financial instrument 140. Operating system 215 can also provide common services for software applications running on processor(s) 210. In accordance with various embodiments, operating system 215 can coordinate resources for multiple applications and modules that allow a user to access and interact with computer terminal 135 and/or computing device 110A-110M.

Profile module 220 can create and/or store profiles for users of offer presentation platform 120 that reflect the personal and financial profiles of the users. Profiles may include offer-related data, user's personal data, financial instrument data, insurance data, bank/financial institution data, credit/debit card data, date of expiry of financial instrument, and data relating to a user's personal identification number (PIN). Personal data of a user can include a name, address, phone number, email address, and the class of a user that identifies whether the user is a residential user or a business owner.

Profile module 220 can receive offer-related data when a user inserts or swipes his or her financial instrument 140 into a computer terminal, which can, for example, be an ATM kiosk or a POS terminal at a merchant location. Profile module 220 can load offers on the financial instrument 140 via one or more processors 210 (or simply a chip) on the financial instrument 140. The chip can be programmed to run a script stored in memory 205. When offer-related information needs to be loaded onto, or changed on, a financial instrument 140, the script in memory 205 can be updated to include the new (or updated) offer-related information.

Visual indication module 225 can provide visual indications of offers via LED lights (or other types of lights) included inside or on the surface of the financial instrument 140, or via an LED screen that displays offer-related information. In some scenarios, the color or the flashing pattern of the LED/LCD lights can change depending on how long an offer will be available. For example, an offer that expires in a day might be indicated by a red light, and an offer that expires in seven days or more can be indicated by a green light. Thus, aspects disclosed herein allow different types of light patterns, having various colors or flashing sequences that can correspond to, or be indicative of how long the offer will last. Visual indication module 225 receives a signal from processor(s) 210 (or chip) on the financial instrument 140 in response to the chip receiving offer-related information. In other embodiments, the color or intensity of the flashing light may indicate a value of the offer (e.g., intense blinking means that the offer is at least 5% cash back on a purchase).

The chip can receive offer-related information when a user inserts the financial instrument 140 at a computer terminal, such as an ATM kiosk or a POS at a merchant location. The chip can also receive offer-related information wirelessly (e.g., via communication module 230) from a mobile application 105A-105N running on a computing device 110A-110M of the user. This wireless communication can be via Bluetooth, NFC, Wi-Fi, RFID, or any other wireless technology.

Communication module 230 facilitates receiving offer-related information wirelessly from a mobile application running on a computing device of the user. This wireless communication can be via Bluetooth, NFC, Wi-Fi, RFID, or any other wireless technology. In some embodiments, communication module 230 can receive offer-related information from a device installed at a merchant location. The device can, for example, be a Bluetooth Low Energy (BLE) beacon. In some embodiments, communication module 230 can send information to a user's computing device. Such information can be financial information (e.g., as provided by profile module 220) such as pending balance, details of transactions made using the financial card, and the like. In some embodiments, communication module 230 can facilitate interaction with a money transfer application (e.g., a mobile wallet), a social networking application, and a gaming application. For example, communication module 230 can receive and/or transmit a user's financial information associated with the financial instrument 140 to the mobile wallet.

Figure 3:
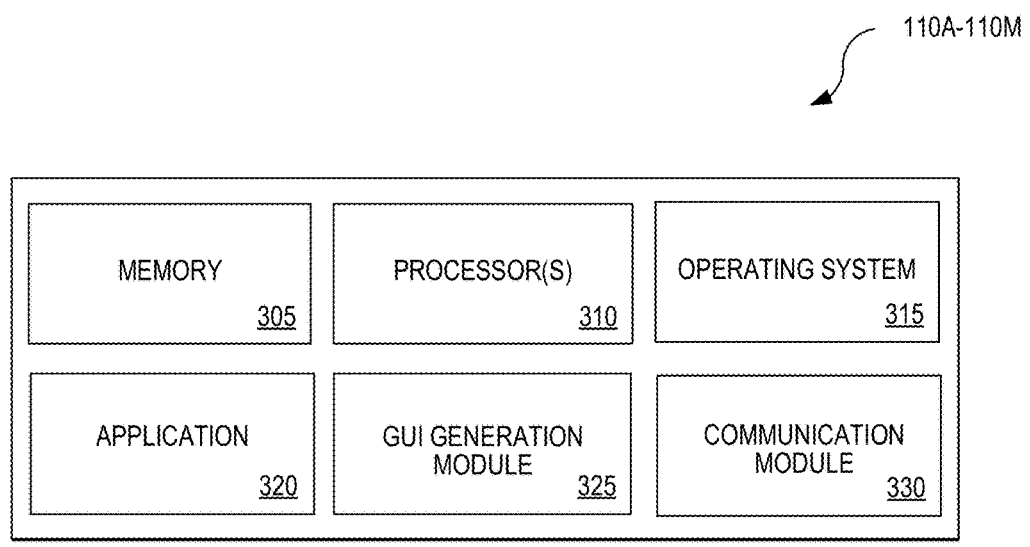
FIG. 3 illustrates various components associated with an offer presentation platform that may be used in accordance with various embodiments of the present disclosure.

FIG. 3 illustrates a set of components according to one or more embodiments of the present disclosure. The components in FIG. 3 can be included in a computing device 110A-110M of the user. According to the embodiments shown in FIG. 3, a computing device 110A-110M can include memory 305, one or more processors 310, operating system 315, application 320, a GUI generation module 325, and a communication module 330. Other embodiments of the present invention may include some, all, or none of these modules and components, along with other modules, applications, and/or components. Still yet, some embodiments may incorporate two or more of these modules and components into a single module and/or associate a portion of the functionality of one or more of these modules with a different module.

Memory 305 can be any device, mechanism, or populated data structure used for storing information, as described above for memory 205. Memory 305 can store instructions for running one or more applications or modules on processor(s) 310. For example, memory 305 could be used in one or more embodiments to house all or some of the instructions needed to execute the functionality of application 320, GUI generation module 325, and communication module 330.

Application 320 can access a server and/or a platform associated with an organization to, for example, receive offers from offer presentation platform 120. In some embodiments, application 320 can interact with other applications on the user's computing device. Application 320 can also include applications such as a money transfer application (e.g., a mobile wallet), a social networking application, and a gaming application.

GUI generation module 325 can generate one or more GUI screens that allow interaction with a user. In at least one embodiment, GUI generation module 325 generates a graphical user interface receiving and/or conveying information to the user's computing device and/or financial instrument 140.

Communication module 330 facilitates communication with a financial instrument via wireless communication methods such as NFC, Bluetooth, Wi-Fi, etc. For example, communication module 330 can receive offer-related information from offer presentation platform 120 and convey the same to a user's financial instrument 140. In some embodiments, communication module 330 can have geolocation (e.g., GPS) capabilities. In such embodiments, a user's computing device can determine a location of the user based on the geolocation capability. This location information can be conveyed to offer presentation platform 120. The offer presentation platform 120 can then send targeted offers to the user's computing device 110A-110M based on the location information. For example, the location information can be for merchants, restaurants, shops, coffee shops, bars, stores, etc. in the vicinity of, or at the location of, the user.

Figure 4:
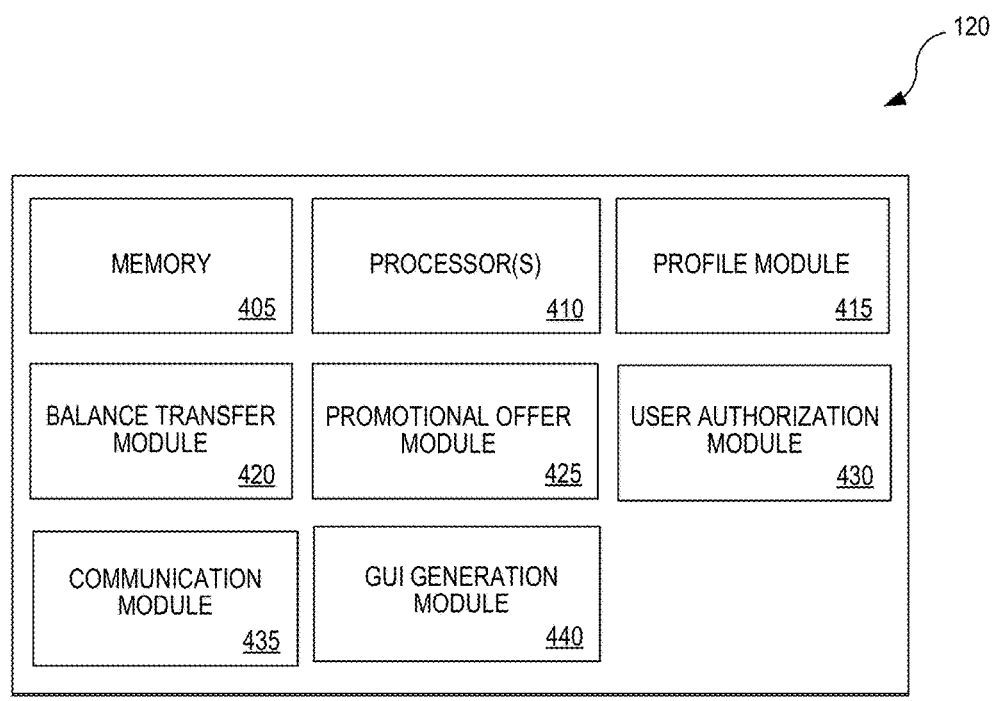
FIG. 4 illustrates various components of an offer presentation platform that may be used in accordance with various embodiments of the present disclosure.

FIG. 4 illustrates a set of components within offer presentation platform 120 according to one or more embodiments of the present disclosure. According to the embodiments shown in FIG. 4, a presentation platform 120 can include memory 405, one or more processors 410, profile module 415, balance transfer module 420, promotional offer module 425, user authorization module 430, communication module 435, and GUI generation module 440. Other embodiments of the present disclosure may include some, all, or none of these modules and components, along with other modules, applications, and/or components. Still yet, some embodiments may incorporate two or more of these modules and components into a single module and/or associate a portion of the functionality of one or more of these modules with a different module.

Memory 405 can be any device, mechanism, or populated data structure used for storing information, as described above for memory 205. Memory 405 can store instructions for running one or more applications or modules on processor(s) 410. For example, memory 405 could be used in one or more embodiments to house all or some of the instructions needed to execute the functionality of balance transfer module 420, promotional offer module 425, user authorization module 430, communication module 435, and GUI generation module 440.

Profile module 415 can create and/or store profiles for users of offer presentation platform 120 that reflect the personal and financial profiles of the users. Profiles may include offer-related data, user's personal data, financial instrument data, insurance data, bank/financial institution data, credit card/debit card data, date of expiry of the financial instrument, and data relating to a user's PIN. Personal data of a user can include a name, address, phone number, email address, and the class of a user that identifies whether the user is a residential user or a business owner.

In some embodiments, an offer can include a very low interest rate on the credit card. When such offers occur, balance transfer module 420 can facilitate transfer of credit card balances from one account of the user to the account associated with the credit card account of the user.

Promotional offer module 425 facilitates delivery of promotional offers to users. These offers can, for example, be delivered to computing devices 110A-110M of users. In some embodiments, the offers can be sent to the card via POS terminals at merchant locations. Thus, when a user is inserting his or her credit card at a POS, the user can receive the offers delivered to the credit card, either directly from the server or from the POS (when the offer was sent earlier to the POS). In some embodiments, the offers can be delivered to the card via a computer terminal such as an ATM kiosk where the user is inserting his or her credit card.

User authorization module 430 facilitates validation of a user's financial data. For example, when a user inserts his or her credit card at a POS terminal in a merchant location, the user's financial data is transmitted from the user's financial instrument, conveyed by the POS terminal, and sent to user authorization module 430. User authorization module 430 compares the received financial data with the financial data stored in the profile module 415 to validate the user's financial instrument. Upon successful validation, offers are transmitted by the offer presentation platform 120 to the user's location from where the financial data was received. In some embodiments, a user can be at an ATM kiosk, and the financial data can be sent by a computer terminal coupled to the ATM kiosk to the user authorization module 430. In such embodiments, upon successful validation, offers are transmitted by the offer presentation platform 120 to the ATM kiosk.

Figure 5:
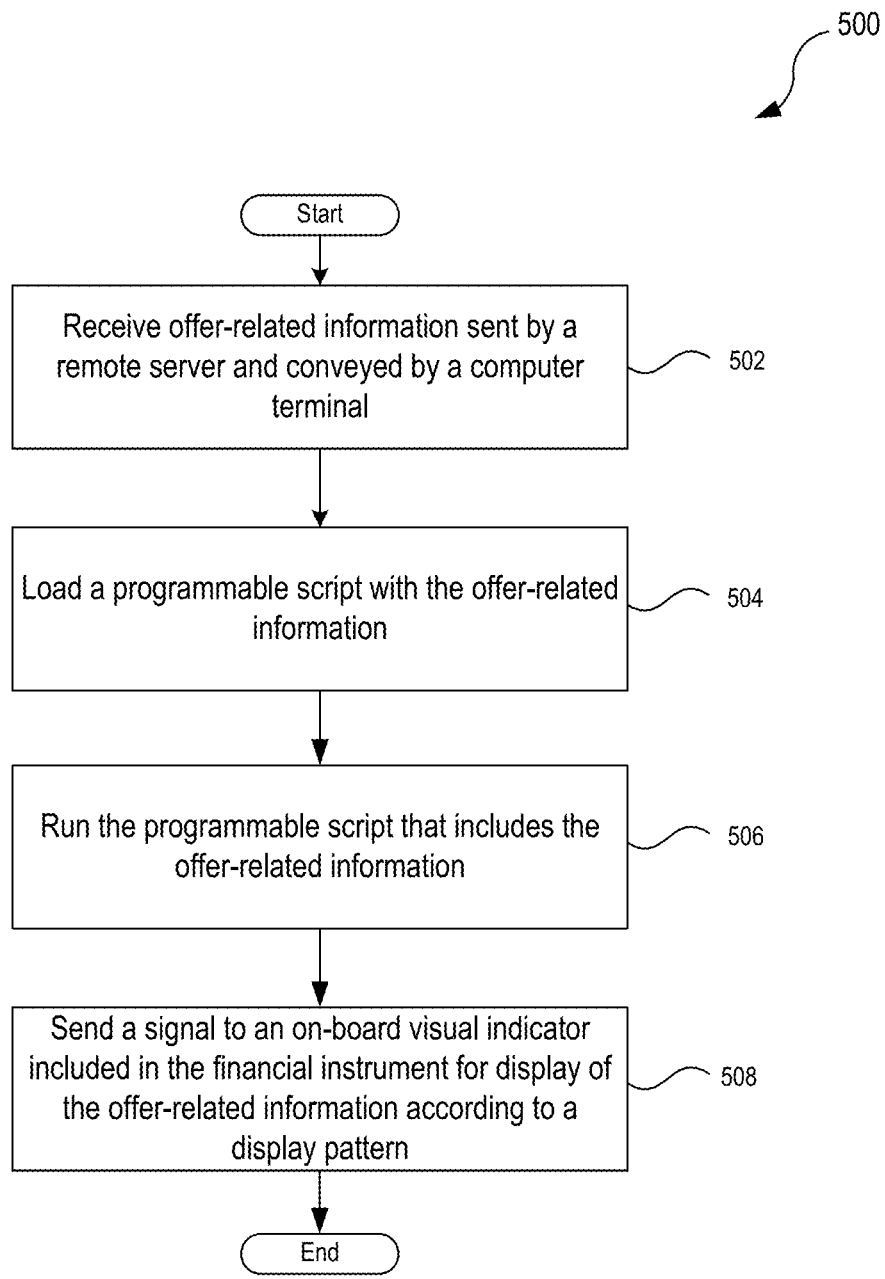
FIG. 5 is a flowchart illustrating a set of operations for presentation of electronic offers to users of financial instruments in accordance with various embodiments of the disclosure.
Figure 6:
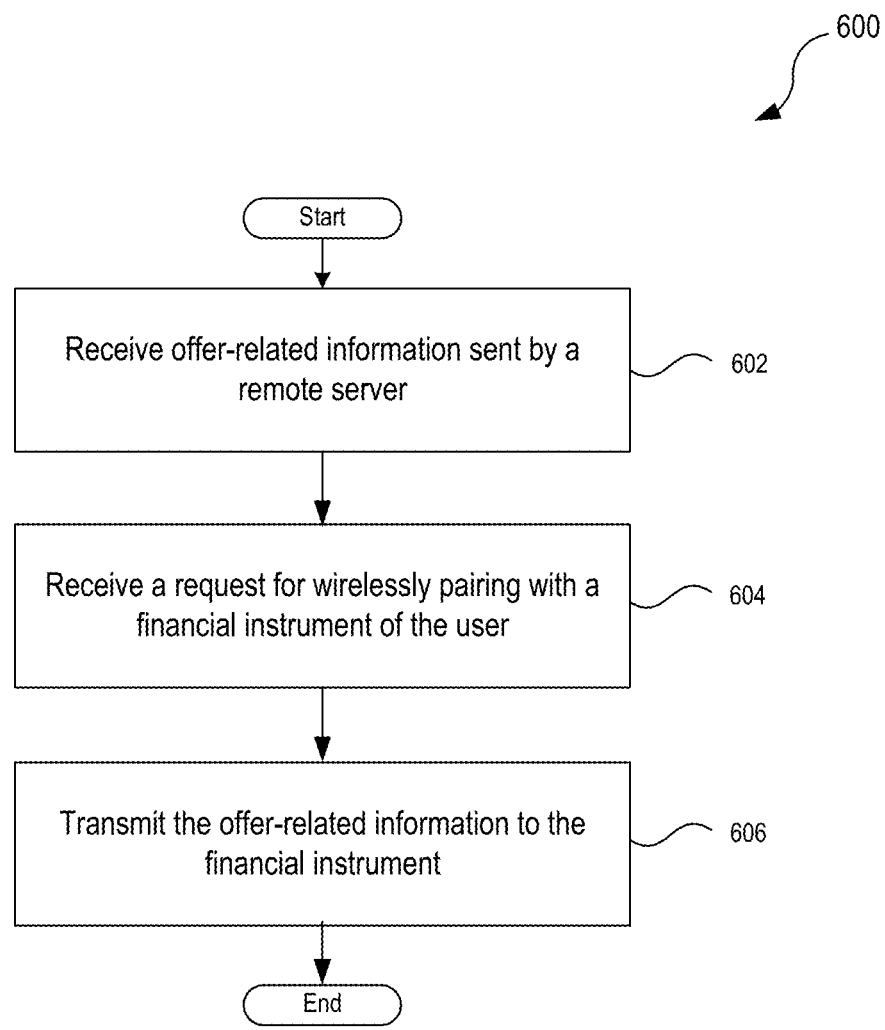
FIG. 6 is a flowchart illustrating a set of operations for presentation of electronic offers to users of financial instruments in accordance with various embodiments of the disclosure.
Figure 7:
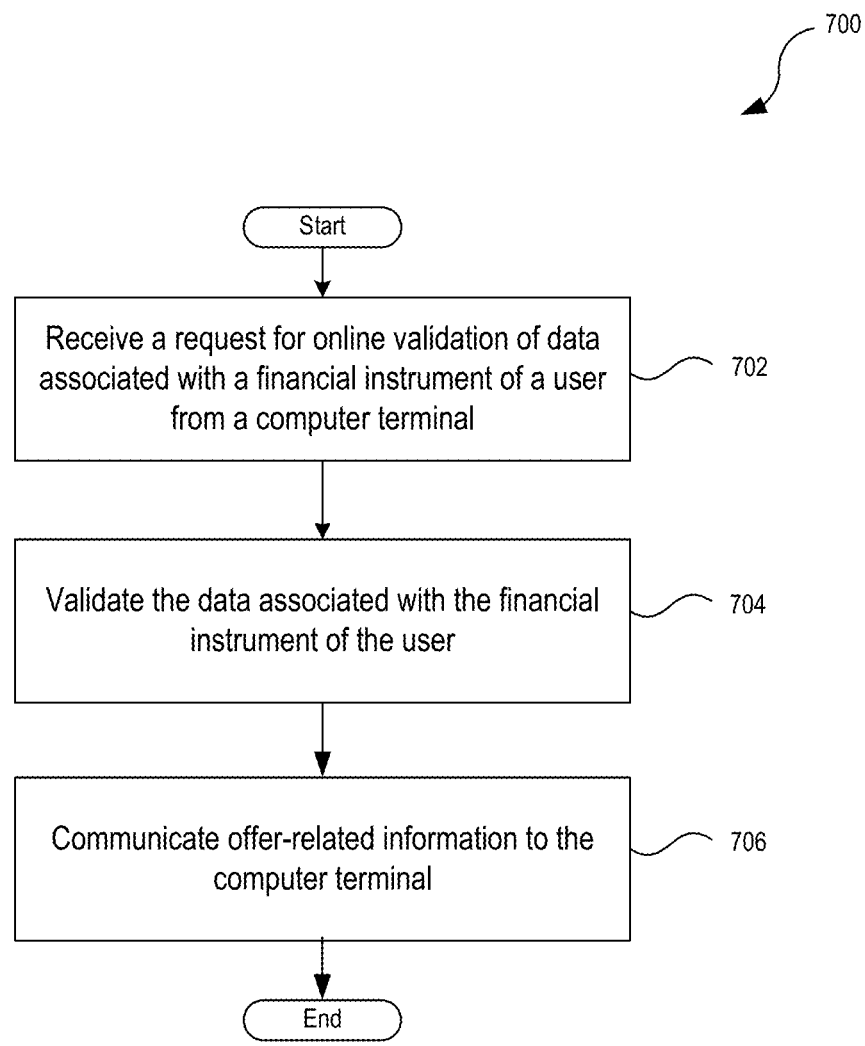
FIG. 7 is a flowchart illustrating a set of operations for presentation of electronic offers to users of financial instruments in accordance with various embodiments of the disclosure.

FIGS. 5-7 are flowcharts illustrating sets of operations for delivery of offer-related data to a financial instrument of a user. In some embodiments, fewer than all of the operations in each set of operations are performed, whereas in other embodiments additional operations are performed. Moreover, in some embodiments, the operations may be performed in different orders or in parallel. The operations can be performed by various components of financial instrument 140 illustrated in FIG. 2.

FIG. 5 is a flowchart illustrating a set of operations 500 for displaying offer-related information on a financial instrument of a user. These operations can, for example, be performed by a processor installed in a financial instrument of a user. Receive operation 502 receives offer-related information sent by a remote server. In some embodiments, the remote server can be offer presentation platform 120. In some embodiments, the remote server can be a bank/financial institution or a merchant computer. The offer-related information can be received, for example, when a user inserts his or her credit card at a POS or an ATM kiosk.

After receiving offer-related information, loading operation 504 loads a programmable script with the offer-related information. The programmable script can be stored in a local memory of the financial instrument. Running operation 506 runs the programmable script that includes the offer-related information. Upon running the script, sending operation 508 sends a signal to on-board visual indicator included in the financial instrument. The signal causes the display of the offer-related information according to a display pattern (e.g., flashing lights according to a sequence). The on-board visual indicator can also include a display screen configured to present the offer-related information in character text. In some embodiments, the financial instrument can communicate with a computing device of the user (e.g., via Bluetooth, NFC, or RFID technology) to receive offer-related information transmitted by the computing device of the user. The process terminates thereafter.

FIG. 6 is a flowchart illustrating a set of operations 600 for displaying offer-related information on a financial instrument of a user. These operations can, for example, be performed by a mobile application running on a computing device of the user. Receive operation 602 receives offer-related information (e.g., in the form of push notifications) from offer presentation platform 120 or from a merchant computer. Receive operation 604 receives a request for wirelessly pairing with a financial instrument of the user (e.g., via Bluetooth, NFC, or RFID technology). Transmit operation 606 transmits the offer-related information to the financial instrument. The process terminates thereafter.

FIG. 7 is a flowchart illustrating a set of operations 700 for displaying offer-related information on a financial instrument of a user. These operations can, for example, be performed by offer presentation platform 120. Receive operation 702 receives a request for online validation of user financial instrument data, e.g., the user's PIN, credit card number, and other such data. Validate operation 704 validates the financial instrument data. Communicate operation 706 communicates the offer-related information (e.g., balance transfer offers and promotional offers) to a computer terminal such as an ATM kiosk or a POS terminal at a merchant location. The process terminates thereafter.

Figure 8:
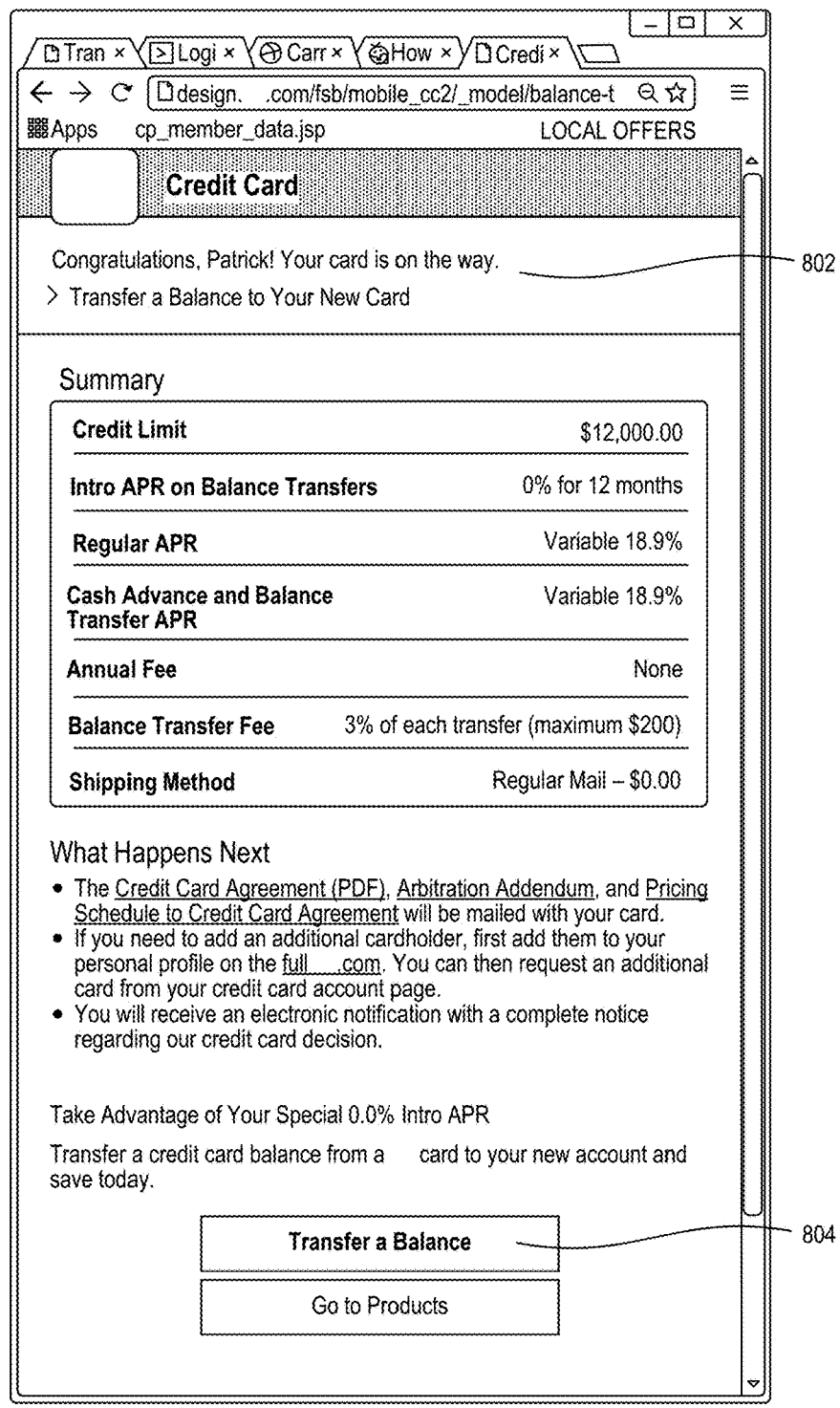
FIGS. 8-13 illustrate example GUIs depicting electronic offers and/or offer-related information to users of financial instruments in accordance with various embodiments of the disclosure.
Figure 9:

FIGS. 8-13 illustrate example GUIs depicting electronic offers and/or offer-related information to users of financial instruments in accordance with various embodiments of the disclosure. For example, FIG. 8 is a GUI showing a balance transfer offer developed in accordance with various embodiments of the disclosure. As shown in region 802, a user "Patrick" has opted to transfer a balance on a credit card with a credit limit of $12,000.00 with a 0% annual percentage rate (APR) for 12 months. Other details associated with the new card are also shown in FIG. 8. When a user clicks on button 804 "Transfer a Balance," a GUI depicted in FIG. 9 is displayed.

FIG. 9 is a GUI that provides a user an option to transfer balances between credit cards accounts of the user. The credit cards can be affiliated (or, optionally non-affiliated) with the offer presentation platform 120. For example, in FIG. 9, a user has selected the option to transfer the balance from one card to another card. Details of the card from which funds are to be transferred from are to be provided in region 902. In some aspects, the offer presentation platform 120 can provide offers to users in real time, e.g., while a user is browsing his or her account information on a GUI displayed via the offer presentation platform 120. In some embodiments, the offer presentation platform 120 can communicate with a user's financial institutions and banks to retrieve financial information (e.g., details of credit cards affiliated with such financial institutions and banks) of a user in real time or near real time. When a user clicks on "Next" button 904, a GUI depicted in FIG. 10 is displayed.

Figure 10:
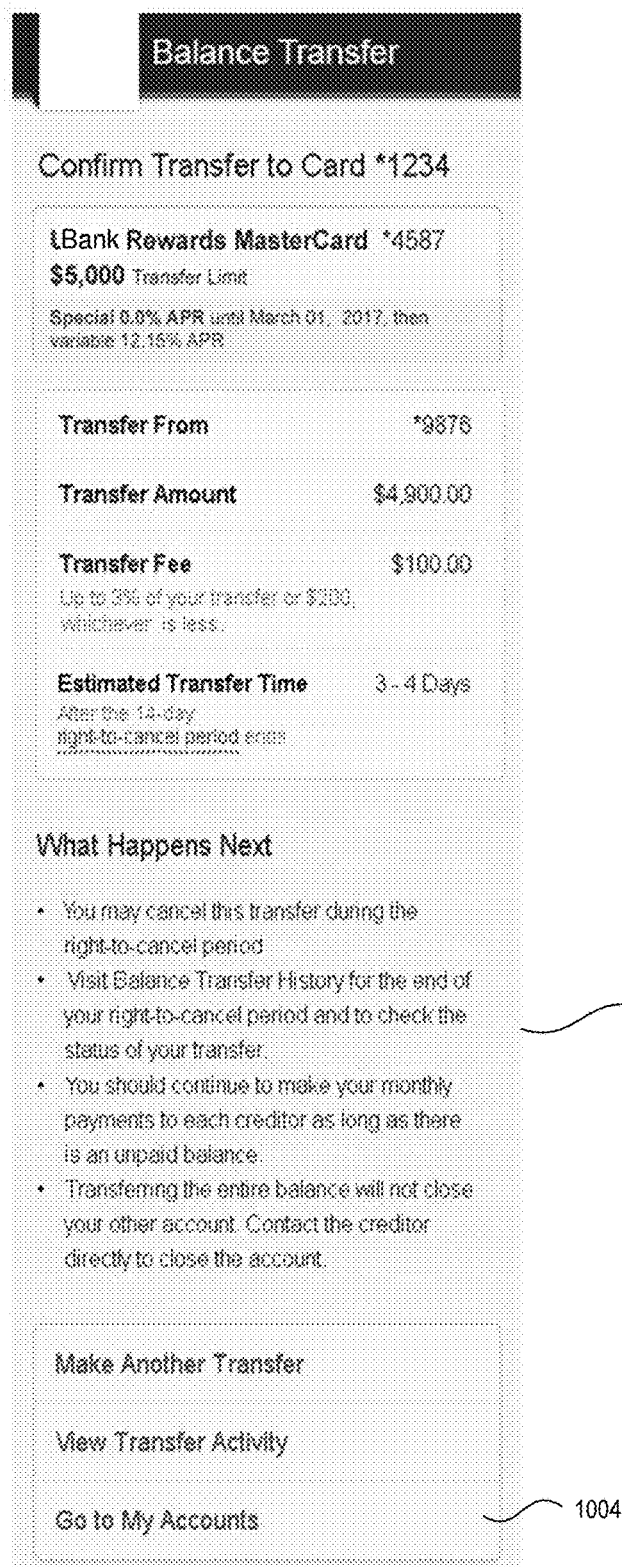

FIG. 10 is a GUI that displays a summary of the balance transfer request from a user. Information relating to next steps in the balance transfer process are displayed in region 1002. Thus, embodiments of the present disclosure facilitate users to receive offer-related information in real time or near real time, as depicted in FIG. 10. When a user clicks on "Go to My Accounts" button 1004, a GUI depicted in FIG. 11 is displayed.

Figure 11:
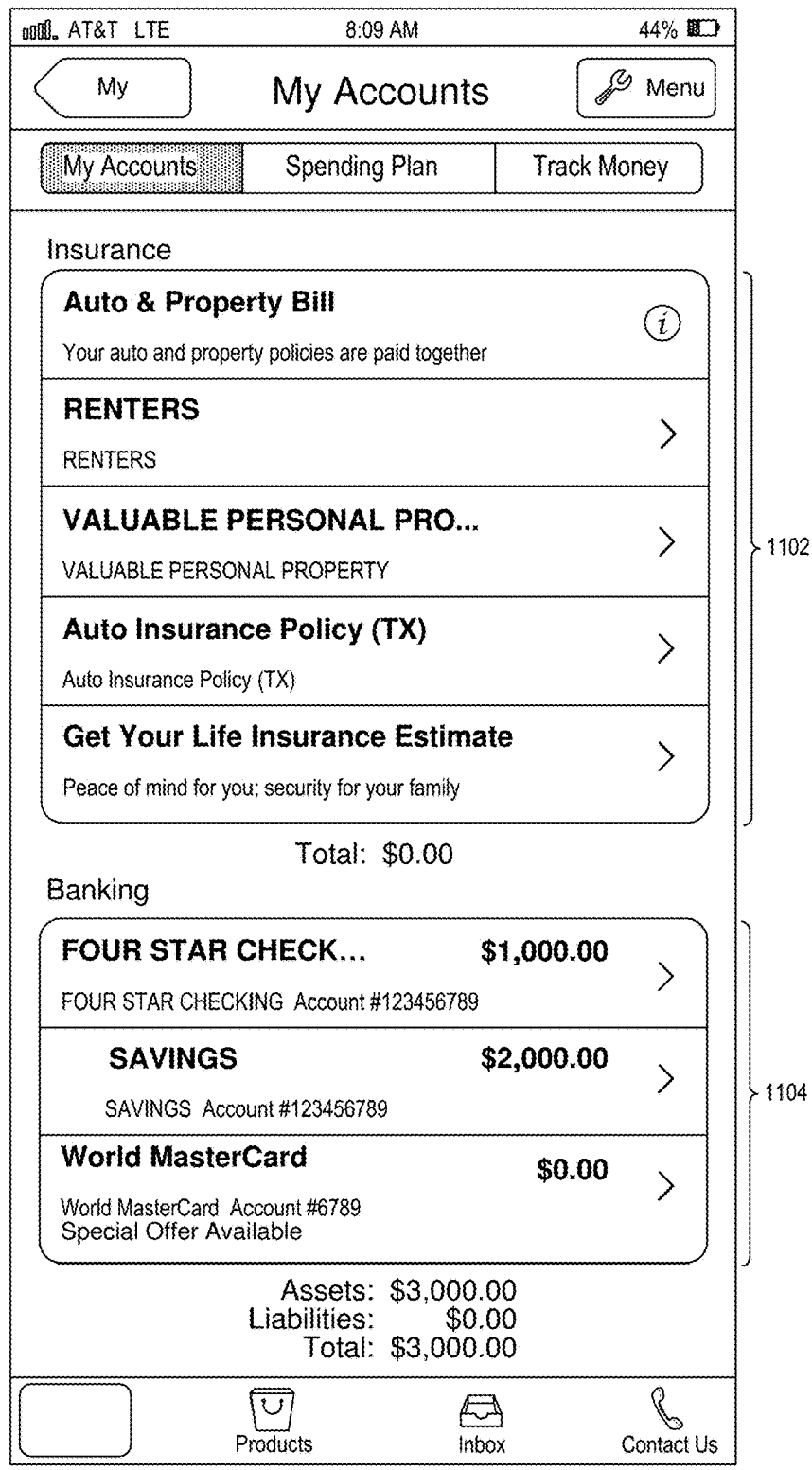

FIG. 11 is a GUI that displays a summary of items included in a user's financial account summary. For example, region 1102 displays insurance-related items of a user, and region 1104 displays banking-related items of a user.

Figure 12:
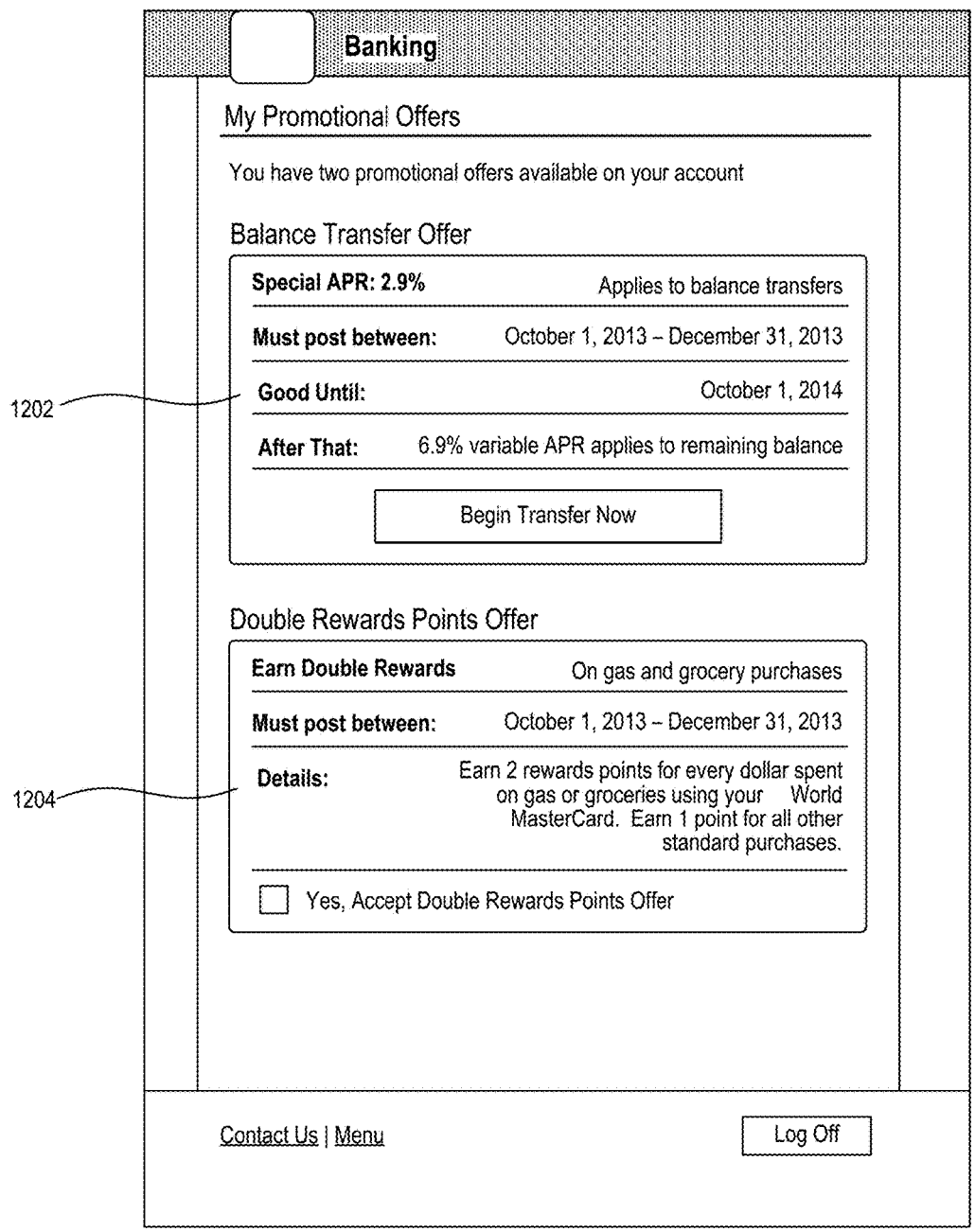

FIG. 12 is a GUI that displays promotional offers and balance transfer offers to users. For example, a balance transfer offer is shown in region 1202. This balance transfer offer applies to all balance transfers and is available until Oct. 1, 2014. A promotional offer, such as points earned for using a credit card, is shown in region 1204. Details of the promotional offer indicate a user earns two reward points for every dollar spent on categories such as gas or groceries using a MasterCard, and one point for other purchases.

Figure 13:
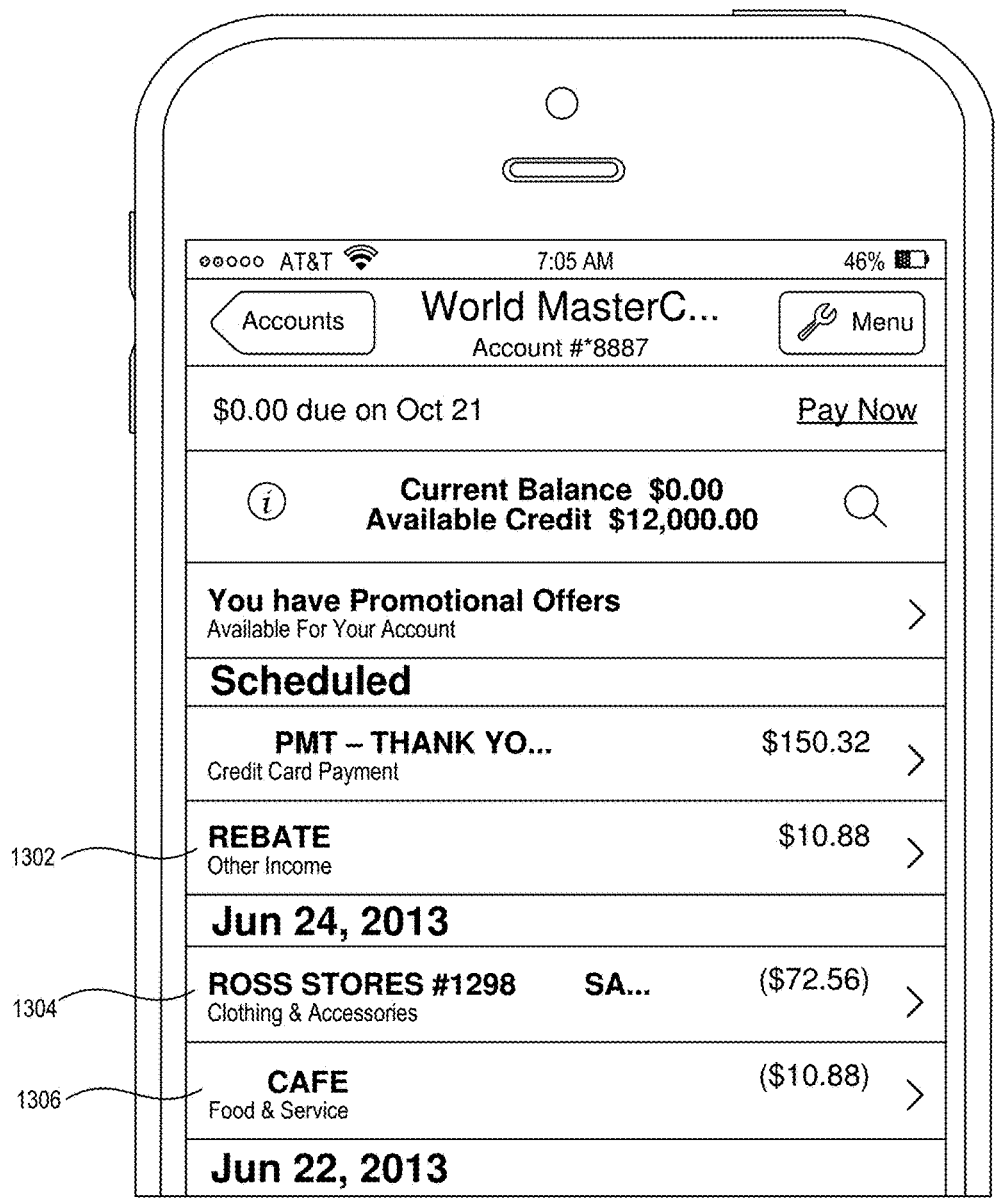

FIG. 13 is a GUI that displays various promotional offers available for a user. Information relating to these offers can come up from one or more merchant locations. For example, region 1302 shows a rebate of $10.88. Region 1304 shows an offer from a merchant location "Ross Stores." Region 1306 shows an offer from Café. All these offers are collected from different merchants for goods or services in different categories, and are provided to users in real time or non-real time with respect to the time of collection of the offer data from the merchants.

Computer System Overview

Figure 14:
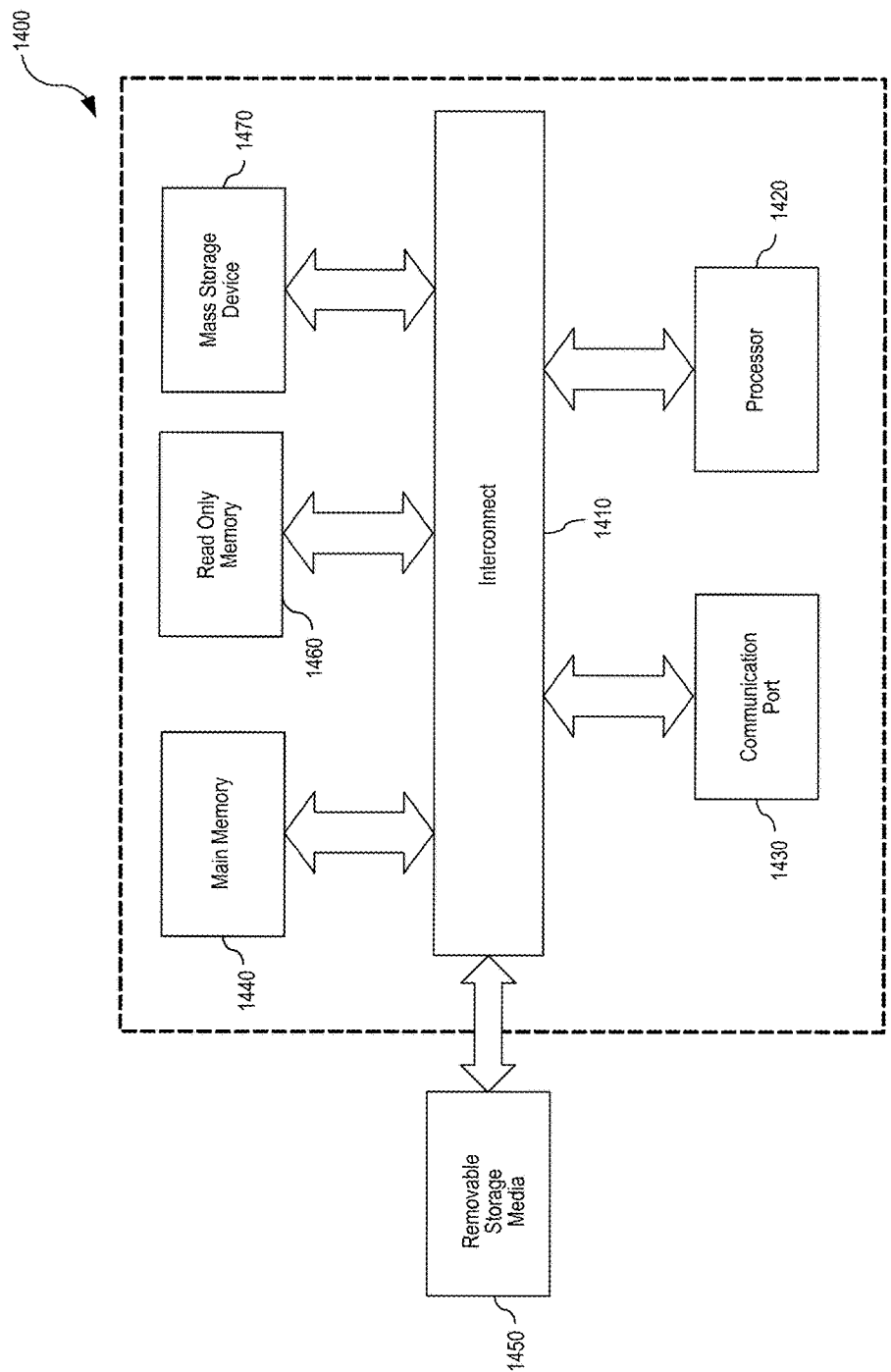
FIG. 14 illustrates an example of a computer system with which some embodiments of the present disclosure may be utilized.

Embodiments of the present disclosure include various steps and operations, which have been described above. A variety of these steps and operations may be performed by hardware components, or they may be embodied in machine-executable instructions that may be used to cause a general-purpose or special-purpose processor programmed with the instructions to perform the steps. Alternatively, the steps may be performed by a combination of hardware, software, and/or firmware. As such, FIG. 14 is an example of a computer system 1400 with which embodiments of the present disclosure may be utilized. According to the present example, the computer system 1400 includes an interconnect 1410, at least one processor 1420, at least one communication port 1430, a main memory 1440, a removable storage media 1450, a read only memory 1460, and a mass storage device 1470.

Processor(s) 1420 can be any known processor, such as, but not limited to, an Intel® Itanium® or Itanium 2® processor(s), or AMD® Opteron® or Athlon MP® processor(s), or Motorola® lines of processors. Communication port(s) 1430 can be any of an RS-232 port for use with a modem-based dialup connection, a 10/100 Ethernet port, or a Gigabit port using copper or fiber. Communication port(s) 1430 may be chosen, depending on a network such as a Local Area Network (LAN), Wide Area Network (WAN), or any network to which the computer system 1400 connects.

Main memory 1440 can be Random Access Memory (RAM) or any other dynamic storage device(s) commonly known in the art. Read only memory 1460 can be any static storage device(s) such as Programmable Read Only Memory (PROM) chips for storing static information such as instructions for processor 1420.

Mass storage device 1470 can be used to store information and instructions. For example, hard disks such as the Adaptec® family of SCSI drives, an optical disc, an array of disks such as RAID, the Adaptec family of RAID drives, or any other mass storage devices may be used.

Interconnect 1410 communicatively couples processor(s) 1420 with the other memory, storage, and communication blocks. Interconnect 1410 can be a PCI/PCI-X- or SCSI-based system bus, depending on the storage devices used.

Removable storage media 1450 can be any kind of external hard-drives, floppy drives, IOMEGA® Zip Drives, Compact Disc-Read Only Memory (CD-ROM), Compact Disc-Re-Writable (CD-RW), or Digital Video Disc-Read Only Memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application and the appendices are given below.

The terms "connected" or "coupled" and related terms are used in an operational sense and are not necessarily limited to a direct physical connection or coupling. Thus, for example, two devices may be coupled directly or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean that the particular feature, structure, or characteristic following the phrase is included in at least one embodiment of the present disclosure and may be included in more than one embodiment of the present disclosure. In addition, such phrases do not necessarily refer to the same embodiments or to different embodiments.

If the specification states a component or feature "may," "can," "could," or "might" be included or have a characteristic, that particular component or feature is not required to be included or to have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs) interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks, as one skilled in the art will appreciate. As such, the illustrated applications of the embodiments of the present disclosure are not meant to be limiting, but instead are examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing, from the personal computer to large network mainframes and servers.

In conclusion, the present disclosure discloses novel systems, methods, and arrangements for presenting financial instrument offers. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

What is claimed is:

1. A system comprising:
   a remote server configured to perform operations comprising:
   receiving a request for validation of financial instrument data associated with a financial instrument of a user initiated when the financial instrument is inserted into a point-of-sale or a kiosk, the request sent by the point-of-sale or the kiosk and including financial instrument data of the user,
   upon successfully validating the financial instrument data associated with the financial instrument of the user, communicating offer-related information to the point-of-sale or the kiosk for loading the offer-related information on the financial instrument of the user; and
   the financial instrument of the user in electronic communication with the remote server and configured to perform operations comprising:
   receiving the offer-related information sent by the remote server and conveyed by the point-of-sale or the kiosk,
   loading a programmable script with the offer-related information, the programmable script stored in a local memory of the financial instrument, and
   upon running the programmable script that includes the offer-related information, sending a signal to an on-board visual indicator included in the financial instrument for display of the offer-related information according to a display pattern,
   wherein the display pattern uses lights to indicate a time period that an offer in the offer-related information is valid,
   wherein a first color of the lights indicates a first time period in which the offer is valid,
   wherein a second color of the lights indicates a second time period in which the offer is valid; and the remote server further configured to perform the operations comprising:
in response to validating a transaction for the financial instrument at the point-of-sale or the kiosk during the time period that the offer is valid, applying the offer.

2. The system of claim 1, wherein the financial instrument of the user is further configured to perform the operations comprising:
running the programmable script that includes the offer-related information, upon loading the programmable script with the offer-related information.

3. The system of claim 1, wherein the on-board visual indicator includes one or more liquid crystal display (LCD) lights and the display pattern corresponds to a flashing of the LCD lights.

4. The system of claim 1, wherein the on-board visual indicator includes one or more liquid crystal display (LCD) lights and the display pattern corresponds to a flashing of the LCD lights according to a sequence.

5. The system of claim 1, wherein the on-board visual indicator includes one or more liquid crystal display (LCD) lights of different colors and the display pattern corresponds to a flashing of the LCD lights.

6. The system of claim 1, wherein the on-board visual indicator includes a display screen configured to present the offer-related information in character text.

7. The system of claim 1, wherein the offer-related information is a first offer-related information, the signal is a first signal, the display pattern is a first display pattern, the financial instrument further configured to perform the operations comprising:
wirelessly communicating with a mobile application running on a mobile computing device of the user,
receiving second offer-related information from the mobile application for loading the second offer-related information on the financial instrument of the user,
updating the programmable script with the second offer-related information, the programmable script stored in the local memory of the financial instrument, and
upon running the programmable script that includes the second offer-related information, sending a second signal to the on-board visual indicator included in the financial instrument for display of the second offer-related information according to a second display pattern.

8. The system of claim 7, wherein the on-board visual indicator includes one or more liquid crystal display (LCD) lights and the second display pattern corresponds to a flashing of the LCD lights.

9. The system of claim 7, wherein the on-board visual indicator includes one or more liquid crystal display (LCD) lights and the second display pattern corresponds to a flashing of the LCD lights according to a sequence.

10. The system of claim 7, wherein the on-board visual indicator includes one or more liquid crystal display (LCD) lights of different colors and the second display pattern corresponds to a flashing of the LCD lights.

11. The system of claim 7, wherein the on-board visual indicator includes a display screen configured to present the offer-related information in character text.

12. A system comprising:
a remote server configured to perform operations comprising:
receiving a request for online validation of financial instrument data associated with a financial instrument of a user, the request sent by a point-of-sale or a kiosk and including financial instrument data of the user, the request initiated when the user inserts the financial instrument in real time at the point-of-sale or the kiosk, and
upon successfully validating the financial instrument data, communicating information relating to successful validation to the point-of-sale or the kiosk; and
the financial instrument of the user in electronic communication with the remote server and configured to perform operations comprising:
wirelessly communicating with a mobile application running on a mobile computing device associated with the user,
receiving offer-related information from the mobile application for loading the offer-related information on the financial instrument of the user,
loading a programmable script with the offer-related information, the programmable script stored in a local memory of the financial instrument, and
upon running the programmable script that includes the offer-related information, sending a signal to an on-board visual indicator included in the financial instrument for display of the offer-related information according to a display pattern,
wherein the display pattern uses lights to indicate a time period that an offer in the offer-related information is valid,
wherein a first color of the lights indicates a first time period in which the offer is valid,
wherein a second color of the lights indicates a second time period in which the offer is valid; and
the remote server further configured to perform the operations comprising:
in response to validating a transaction for the financial instrument at the point-of-sale or the kiosk during the time period that the offer is valid, applying the offer.

13. The system of claim 12, wherein the point-of-sale or the kiosk is a POS coupled to a merchant computer, or an ATM machine associated with a bank or financial institution.

14. The system of claim 12, wherein the on-board visual indicator includes one or more liquid crystal display (LCD) lights and the display pattern corresponds to a flashing of the LCD lights.

15. The system of claim 12, wherein the on-board visual indicator includes one or more liquid crystal display (LCD) lights and the display pattern corresponds to a flashing of the LCD lights according to a sequence.

16. The system of claim 12, wherein the on-board visual indicator includes one or more liquid crystal display (LCD) lights of different colors and the display pattern corresponds to a flashing of the LCD lights.

17. The system of claim 12, wherein the on-board visual indicator includes a display screen configured to present the offer-related information in character text.

18. A system comprising:
a mobile application running on a computing device associated with a user in a first electronic communication with a server and a second electronic communication with a financial instrument, wherein the mobile application is configured to perform operations comprising:
receiving, via the first electronic communication with the server, offer-related information for loading the offer-related information on the financial instrument,
receiving, via the second electronic communication with the financial instrument, a request for wirelessly pairing with the financial instrument, and transmitting, via the second electronic communication with the financial instrument, the offer-related information received from the server; and the financial instrument configured to perform operations comprising:
   receiving the offer-related information from the mobile application via the second electronic communication,
   loading a programmable script with the offer-related information, the programmable script stored in a local memory of the financial instrument upon the user inserting the financial instrument in real time at a point-of-sale or a kiosk, and
   upon running the programmable script that includes the offer-related information, sending a signal to an on-board visual indicator included in the financial instrument for display of the offer-related information according to a display pattern,
   wherein the display pattern uses lights to indicate a time period that an offer in the offer-related information is valid,
   wherein a first color of the lights indicates a first time period in which the offer is valid,
   wherein a second color of the lights indicates a second time period in which the offer is valid; and the server configured to perform operations comprising:
   in response to validating a transaction for the financial instrument at the point-of-sale or the kiosk during the time period that the offer is valid, applying the offer.

19. The system of claim 18, wherein the on-board visual indicator includes one or more liquid crystal display (LCD) lights of different colors and the display pattern corresponds to a flashing of the LCD lights.

20. The system of claim 18, wherein the on-board visual indicator includes a display screen configured to present the offer-related information in character text.

* * * * *